2,802,728

SUPERPHOSPHATE AND ITS MANUFACTURE

Lloyd L. Jaquier, Jr., Bartlesville, Okla., assignor to Phillips Petroleum Company, a corporation of Delaware No Drawing. Application October 12, 1953, Serial No. 385,696

16 Claims. (Cl. 71—40)

This invention relates to a process for production of superphosphate by the acidulation of a phosphate rock, and to the product obtained thereby.

In one aspect, the invention relates to a method for obtaining a reduction of curing time in the process for producing superphosphate by sulfuric acid acidulation of phosphate rock by forming a mixture of a wetting agent and the sulfuric acid. In another aspect, the invention relates to a method for production of a superphosphate of improved physical properties, e. g., improved flowability and decreased caking tendency. Other aspects and advantages of the invention will be apparent from this specification.

According to my invention, a wetting agent is employed in the acidulation of phosphate rock to produce superphosphate; also according to my invention a superior superphosphate is obtained.

In the well-known process for production of superphosphate from phosphate rock, i. e., a mineral containing a significant proportion of tricalcium phosphate, comminuted phosphate rock is first mixed with sulfuric acid in the cold for a matter of minutes. The acid employed is from 40 to 90, preferably 55 to 75 weight percent $H_2SO_4$. Following a brief mixing period, the reaction mass is dropped into the den or chamber where the reaction started in the mixing step continues for an extended period, usually several hours, or even days. Although there are competing and side reactions, the main reaction is usually represented as

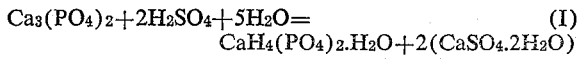

The mixture of monocalcium phosphate and gypsum formed are the main ingredients of superphosphate. Due to the fact that the starting material is seldom pure tricalcium phosphate, the superphosphates of commerce also contain other inorganic impurities; further, since a slightly deficient amount of acid is usually used, there is normally present a minor portion of dicalcium phosphate in the product. The mono- and dicalcium phosphates together constitute the "available phosphate" in superphosphate fertilizer.

In the den, the temperature rises to about 212° F., and gases are evolved from the mass which sets up to a dry, hard, porous condition. The major portion of the reaction (I) takes place in the den, from whence the mass is transferred to storage piles where the superphosphate is allowed to cure for several days or weeks before it is ready for shipment. It is crushed or ground to a flowable powder either before shipment, or prior to use.

The foregoing process steps are well described in the art, as are other details incident to superphosphate production, which need not be described here for an understanding of the present invention.

It has also been realized by those skilled in superphosphate manufacture that the time which the reaction mass must remain in the den is dependent upon the rate of reaction occurring therein; that the curing time is dependent upon the rate of cure and that, within limits, the longer the cure the less acid required. Or, put another way, a higher rate of cure will allow less acid and/or a shorter curing time to be employed to obtain a given degree of cure. By curing is means the further reaction of free acid on unchanged portions of the rock. The higher the degree of cure, the higher the "available phosphate" content of the superphosphate fertilizer. It is therefore apparent that a method which increases the wetting by the acid in the mixing of the rock and the rate of reaction in the den, and which also decreases the cure time, is of great technical and economic value since not only is the production capacity of the den increased, but also storage costs of superphosphate undergoing cure are reduced in direct proportion to the reduction of curing time. When operating the foregoing process according to the improvement of my invention, the above-mentioned advantages are obtained; further, less acid is required, and a superphosphate with improved properties results.

The improved process and product of my invention results from providing a wetting agent in the sulfuric acid, preferably before mixing with the comminuted phosphate rock.

Preferably the amount of wetting agent used is from 0.01 to 3 weight percent of the sulfuric acid, by which latter term it is means to include the $H_2SO_4$ plus water contained therein; however, the advantages of my process are obtained, within limits, in a proportion to the amount of wetting agent employed, and from 0.002 to 6 weight percent or even greater or lesser amounts can be employed to advantage.

Any wetting agent can be employed in my process. Since in present day equipment the temperature during the acidulation reaches about 212° F., it is preferred that the wetting agent employed is one which is not substantially decomposed by sulfuric acid at 212° F.

Organic compound wetting agents are useful. However, the hydrocarbon sulfuric and sulfonic acids and their alkaline earth and alkali metal salts are particularly efficacious wetting agents and include: alkyl, cycloalkyl, aralkyl, cycloalkyl-substituted alkyl, and alkyl substituted cycloalkyl sulfuric and sulfonic acids, and the aryl and alkaryl sulfonic acids; and the alkaline earth and alkali metal salts of each of the foregoing said acids. Hydrocarbon sulfuric acids and hydrocarbon sulfonic acids are half esters of sulfuric acid and sulfurous acid wherein one hydrogren atom of the hydrocarbon has been replaced by the —O—$SO_3H$ group or the —$SO_3H$ group, respectively. These hydrocarbon sulfonic and sulfuric acid wetting agents and their salts preferably contain from 6 to 20 carbon atoms in the molecule. The hydrocarbon sulfuric acids are otherwise known as bisulfates, e. g., octyl sulfuric acid is also known as octyl bisulfate. Other especially efficacious wetting agents include the polyoxyalkylene ethers such as aryl, alkyl and alkaryl polyoxyethylene ethers and the aryl, alkyl and alkaryl polyoxypropylene ethers represented by the formula:

where R is a hydrocarbon radical, such as an alkyl, an aryl or an alkaryl group, containing from 6 to 20 carbon atoms; X is sulfur or oxygen; $m$ is 2 or 3; and $n$ is an integer from 4 to 12. Sulfates of such polyoxyethylene and polyoxypropylene ethers can also be used, that is to say, the H of the end —OH group may be replaced in the formula by —$SO_3M$, where M is hydrogen, alkaline earth metal, or alkali metal.

Sulfonates which are made as by-products in the treatment of petroleum with strong sulfuric acid are one class of wetting agents which may be used in the present invention. These sulfonates are made by reacting strong sulfuric acid with petroleum and compounds are formed which may have sulfonic and sulfuric ester radicals. The petroleum sulfonates may be divided into two types, those which are water soluble (so-called green acids) and those which are hydrocarbon soluble (the mahogany acids).

Sulfated amides may also be used as wetting agents. The sulfated amides may be made by converting a fatty acid, such as oleic acid, to the amide by using ammonia, or primary, or secondary aliphatic, aromatic or heterocyclic amines. The amides are reacted with sulfuric acid to form an alkylamide sulfuric acid such as oleamide sulfuric acid.

The alkaline earth and the alkali metal salts, as well as the acids of the sulfated amides and the above-mentioned sulfonates can be used as wetting agents.

The mixture of wetting agent and sulfuric acid can be formed in any desired manner and at any stage in the acidulation, in some cases even after the acid has been added to the comminuted rock. As stated, however, it is presently preferred to form the admixture of wetting agent and acid before acidulating the rock.

The mixture of wetting agent and the sulfuric acid can be formed simply by mixing the wetting agent with the sulfuric acid. Or it can be formed by mixing with the sulfuric acid a material or compound which is capable of reacting with the sulfuric acid to form a wetting agent, and allowing the said material to react with the sulfuric acid to form a wetting agent in situ. For example, the alkyl or aralkyl sulfuric acids can be formed in situ by adding the corresponding alcohol or the corresponding olefin to the sulfuric acid and allowing the well known sulfation reaction to take place.

In addition to the process advantages of my invention hereinbefore noted, the superphosphate product of my invention is more friable and therefore more easily crushed; and, probably because of the wetting agent so intimately dispersed throughout the product, the product when comminuted is of improved flowability and on storage has greatly reduced tendency to cake or form solid masses which must be comminuted before application to the soil, and it more readily disperses into the soil.

*Example I*

To 70 weight percent sulfuric acid is added 0.1 weight percent of sodium dodecylbenzene sulfonate, based on the total mixture.

The acid is employed to acidulate comminuted phosphate rock, analyzing 65 weight percent tricalcium phosphate, thus: the acid is mixed with ground phosphate rock for a few minutes in the cold, and then dropped into a den where it is allowed to react. A very slight deficiency of acid required to theoretically complete the reaction (I), together with an amount of acid which will be consumed by impurities, is employed. Reaction in the den is accompanied by an increase in temperature to about 212° F. and an evolution of evolved gases. The necessary time for the major portion of the reaction to occur, as indicated by the period of time during which appreciable quantities of gases were evolved, is about six hours, after which time the mixture is removed to curing piles, where it is allowed to cure for about one week.

The product of my invention so produced will be found to be quite friable and porous, and, in a comminuted condition, free-flowing. On storage in a comminuted condition even in a humid climate it will be found to have no appreciable caking tendencies.

The foregoing process is repeated using other portions of the same phosphate rock sulfuric acid of the same concentration, and the same ratio of acid to comminuted rock; except that the 0.1 weight percent sodium dodecylbenzene sulfonate is replaced by the same amount of the following wetting agents, each wetting agent representing a separate repetition of the foregoing process: dodecyl sulfonic acid, sodium cetyl sulfonate, calcium tert-octyl sulfonate, the sodium salt of 3,9-diethyl-6-sulfoxydecane, the sodium salt of 7-ethyl-2-methyl-4-sulfoxydecane, sodium lauryl sulfate, nonyl sulfuric acid, naphthalene sulfonic acid, sodium monobutyldiphenyl monosulfonate, calcium ditertiarybutylbenzene sulfonate, cetylbenzenesulfonic acid, sodium naphthalene sulfonate, cyclohexyl acid sulfate, oleamide sulfuric acid, methylcyclohexyl acid sulfate, the reaction product of 1 mole of tert-dodecyl mercaptan per 8 moles of ethylene oxide, the reaction product of 1 mole of tert-butylphenol per 8 moles of ethylene oxide, the reaction product of 1 mole of n-decyl mercaptan per 10 moles of ethylene oxide, the reaction product of 1 mole of hexyl mercaptan per 4 moles of propylene oxide, the sulfated reaction product of the reaction product of 1 mole of decyl phenol per 6 moles of ethylene oxide, the reaction product of 1 mole of octylthiophenol per 11 moles of ethylene oxide; 0.1 weight percent lauryl alcohol added and allowed to form the wetting agent, lauryl sulfonic acid, by reaction with sulfuric acid in situ. In each of these runs improved results are obtained similar to the results obtained when using sodium dodecyl benzene sulfonate, as compared with Example II wherein no wetting agent is employed.

*Example II*

Another portion of the same comminuted phosphate rock is acidulated as in Example I with 70 weight percent sulfuric acid, using the same proportions of acid and rock and the same mixing conditions and mixing time as in Example I, but without the addition of a wetting agent to the sulfuric acid.

The time required for the reaction in the den is about 24 hours, and a curing time of eight weeks is required. Even after this extended curing time the available phosphate in the superphosphate product will be found to be slightly lower than the available phosphate in the products of Example I. Such a product will be found to be less porous and more difficult to crush than products in Example I. On storage in a comminuted condition in a humid climate the product will be found to cake substantially over a period of time.

The wetting or surface active agents disclosed as referred to herein are considered as alternatives for purposes of the present invention and are not necessarily equivalents of each other.

Reasonable variations and modifications are possible within the scope of the foregoing disclosure and the appended claims to the invention, the essence of which is that the acidulation of phosphate rock is effected in the presence of a wetting agent, as described; and that a superphosphate product of superior properties, including increased friability and resistance to caking, is provided.

I claim:

1. In the process for production of a superphosphate from phosphate rock which comprises acidulation of a comminuted phosphate rock with sulfuric acid by mixing said rock with sulfuric acid and by denning and curing the reaction mass which results from said mixing, the step of providing a wetting agent in the sulfuric acid during said acidulation of said rock therewith, said wetting agent being substantially stable in the presence of said sulfuric acid and being a chemical compound selected from the group consisting of: a hydrocarbon sulfonic acid, a hydrocarbon sulfuric acid, petroleum green acids, an alkyl amide sulfuric acid, an alkaline earth and an alkali metal salt of at least one of the foregoing said acids; each of said acids and salts thereof containing from 6 to 20 carbon atoms; a compound of the formula $$R\text{---}X\text{---}[(CH_2)_mO]_nZ$$

where R is a hydrocarbon group containing 6 to 20 carbon atoms inclusive, X is selected from the group consisting of oxygen and sulfur, $m$ is selected from the group consisting of 2 and 3, $n$ is selected from the group consisting of the integers from 4 to 12 inclusive, and Z is selected from the groups consisting of hydrogen and the —SO₃M group where M is selected from the group consisting of hydrogen, alkaline earth metal and alkali metal.

2. The process of claim 1 wherein the said wetting agent is present in an amount ranging from 0.002 to 6 weight percent of the sulfuric acid.

3. The process of claim 1 wherein the said wetting agent is present in an amount ranging from 0.01 to 3 weight percent of the sulfuric acid.

4. The process of claim 1 wherein a mixture of wetting agent and said sulfuric acid is formed prior to acidulation of said rock with said acid.

5. The process of claim 4 wherein the mixture of wetting agent and the sulfuric acid is formed by adding to the sulfuric acid a material which is capable of reacting with the sulfuric acid to form a wetting agent, and allowing the said material to react with the sulfuric acid to form a wetting agent in situ.

6. The process of claim 1 wherein said wetting agent is an alkali metal alkaryl sulfonate.

7. The process of claim 1 wherein said wetting agent is an alkali metal alkyl sulfate.

8. The process of claim 7 wherein said wetting agent is sodium lauryl sulfate.

9. The process of claim 1 wherein said wetting agent is a compound of the formula $$R—O—(CH_2CH_2O)_nH$$

where R and $n$ are defined as in claim 1.

10. The process of claim 9 wherein R is the tert-butylphenyl radical and $n$ is 8.

11. The process of claim 1 wherein said wetting agent is a compound of the formula $$R—S—(CH_2CH_2O)_nH$$

where R and $n$ are defined as in claim 1.

12. The process of claim 11 wherein R is the n-decyl radical and $n$ is 10.

13. The process of claim 11 wherein R is the tert-dodecyl radical and $n$ is 8.

14. The process of claim 5 wherein the said material is lauryl alcohol.

15. A superphosphate product obtained according to the process of claim 1.

16. In the process for production of a superphosphate from phosphate rock which comprises acidulation of a comminuted phosphate rock with sulfuric acid by mixing said rock with sulfuric acid and by denning and curing the reaction mass which results from said mixing, the step of providing petroleum green acids as wetting agents in the sulfuric acid during said acidulation of said rock therewith, said wetting agents being stable in the presence of said sulfuric acid.

References Cited in the file of this patent

UNITED STATES PATENTS

| | | |
|---|---|---|
| 1,710,272 | Richter | Apr. 23, 1929 |
| 2,213,620 | Bancroft et al. | Sept. 3, 1940 |
| 2,218,695 | Leatherman | Oct. 22, 1940 |
| 2,284,002 | Lontz | May 26, 1942 |
| 2,314,091 | Jones | Mar. 16, 1943 |
| 2,418,203 | Stauffer | Apr. 1, 1947 |
| 2,557,730 | Ettel | June 19, 1951 |

OTHER REFERENCES

The American Potato Journal: An Evaluation of Sludge-Acid and Alkylation Acid Superphosphate, Brown et al., pages 89–95, volume 20, April 1943.

Journal of the American Society of Agronomy: Agronomic Value of Alkylation-Acid Superphosphate, Miller et al., volume 36, April 1944, pages 274–280.